US012767540B2

(12) United States Patent
Park et al.

(10) Patent No.: US 12,767,540 B2
(45) Date of Patent: Oct. 20, 2026

(54) ROLL-TO-ROLL MECHANIZED EXFOLIATOR AND AUTOMATIC 2D MATERIALS TRANSFER AND LAYERING SYSTEM

(71) Applicant: BROOKHAVEN SCIENCE ASSOCIATES, LLC, Upton, NY (US)

(72) Inventors: Suji Park, Coram, NY (US); Kevin Yager, East Setauket, NY (US)

(73) Assignee: Brookhaven Science Associates, LLC, Upton, NY (US)

(*) Notice: Subject to any disclaimer, the term of this patent is extended or adjusted under 35 U.S.C. 154(b) by 253 days.

(21) Appl. No.: 18/291,428

(22) PCT Filed: Aug. 18, 2022

(86) PCT No.: PCT/US2022/040777

§ 371 (c)(1),
(2) Date: Jan. 23, 2024

(87) PCT Pub. No.: WO2023/023260

PCT Pub. Date: Feb. 23, 2023

(65) Prior Publication Data

US 2024/0375960 A1 Nov. 14, 2024

Related U.S. Application Data

(60) Provisional application No. 63/234,682, filed on Aug. 18, 2021.

(51) Int. Cl.
*C01B 32/19* (2017.01)
*B30B 3/02* (2006.01)

(52) U.S. Cl.
CPC ................ *C01B 32/19* (2017.08); *B30B 3/02* (2013.01)

(58) Field of Classification Search
None
See application file for complete search history.

(56) References Cited

U.S. PATENT DOCUMENTS

2007/0171619 A1 7/2007 Akita et al.
2007/0281120 A1 12/2007 Minamikawa (Continued)

OTHER PUBLICATIONS

Tantillo, "Automating 2-D Material Exfoliation with Suji Park", Brookhaven National Laboratory (Sep. 22, 2020), https://www.bnl.gov/newsroom/news.php?a=217449, Accessed Nov. 21, 2025 (Year: 2020).*

(Continued)

*Primary Examiner* — Abbas Rashid
*Assistant Examiner* — Adrianna N Konves
(74) *Attorney, Agent, or Firm* — Dorene Price

(57) ABSTRACT

A system and method for exfoliating a layer of exfoliated material from a source material and for stacking the exfoliated layers. The system including a first rotary device and a second rotary device. The first and second rotary devices each being selectively rotatable in a clockwise and counter clockwise directions. A flexible tape having an adhesive surface, the tape extending between the first and second rotary devices. A press roller operably connected to a frame and adapted to provide a biasing force in a first direction. A stage having a chuck for securing a source substrate containing source material, the stage is operably connected to a stage actuator for moving the stage between an initial position and a process position. The tape is disposed between the press roller and the source substrate when the stage is in the process position, wherein the press roller applies pressure to the tape and the source material disposed on the source substrate adheres to the tape, and wherein movement of the stage from the process position back to the initial position causes the tape to exfoliate a layer of exfo- (Continued)

liated material from the source material. A stacker forms a layered heterostructure material using the exfoliated material.

11 Claims, 10 Drawing Sheets

(56) References Cited

U.S. PATENT DOCUMENTS

| | | | | |
|---|---|---|---|---|
| 2008/0236743 | A1* | 10/2008 | Kye .................... | B29C 63/0013 156/759 |
| 2012/0258311 | A1 | 10/2012 | Hong et al. | |
| 2019/0237650 | A1 | 8/2019 | Solovyov | |

OTHER PUBLICATIONS

Tantillo, Ariana, "Automating 2-D Material Exfoliation with Suji Park," an Interview with a CFN staff researcher, Brookaven National Laboratory (Sep. 22, 2020), https://www.bnl.gov/newsroom/news.php?a=217449.

* cited by examiner

ROLL-TO-ROLL MECHANIZED EXFOLIATOR AND AUTOMATIC 2D MATERIALS TRANSFER AND LAYERING SYSTEM

This application is the national stage filing of International Application Number PCT/US2022/040777, filed on Aug. 18, 2022, which claims priority to U.S. Provisional Application No. 63/234,682, filed on Aug. 18, 2021, each of which is incorporated by reference herein in its entirety.

This application claims the benefit of priority to U.S. Provisional Patent Application Ser. No. 63/234,682 filed Aug. 18, 2021, the entire content of which is incorporated herein for all purposes.

STATEMENT OF GOVERNMENT RIGHTS

The present application was made with government support under contract number DE-SC0012704 awarded by the United States Department of Energy. The United States government has certain rights in the invention(s).

BACKGROUND

The present invention relates generally to exfoliators and stackers and more particularly, roll-to-roll mechanized exfoliators to generate ultrathin nanosheets from layered materials and automatic 2D materials transfer and layering systems.

Layered materials exhibit two dimensional (2D) sheets weakly bonded in the layering direction to form a bulk crystal or bulk layered crystal. For instance, van der Waals (vdW) solids such as graphite exhibit strong covalent bonding within layers, but much weaker vdW bonding in the layering direction. Atomically-thin 2D layers or ultrathin nanosheets can be generated by peeling off single layers from the bulk layered crystal. The atomically-thin 2D materials exhibit a host of unique properties owing to anisotropy and atomic-scale confinement; they are being actively applied to challenges in quantum information sciences.

Quantum Information Science (QIS) is an emerging research area that promises to revolutionize computing, communication, and sensing. Two-dimensional (2D) materials are one of the versatile motifs for generating new QIS materials since one layer of them in arbitrary stacks forms heterostructures unconstrained by epitaxy. However, it has been challenging to study and utilize 2D materials because conventional manual exfoliation to generate 2D layers is a low-yield, irreproducible, time-and labor-consuming preparation process.

The 2D material flakes or monolayers of higher quality can be fabricated using manual mechanical exfoliation methods, which is also known as "tape exfoliation" since it involves a human operator manually adhering, pressing on and peeling off an adhesive tape from the parent crystal. The manual mechanical exfoliation provides outstanding-quality flakes. Successful mechanical exfoliation by human operator can be done with many delicate steps that humans can naturally, and even unconsciously, control. Trained researchers or human operators have different ways of doing the mechanical exfoliation, developed through experience. For example, researchers or human operators deploying a traditional manual method will apply or try different contact pressures, substrate temperatures, and tape peel-off angles. The manual method is simple and handy, but the yield is low (is not cost effective), the generated material quality is highly unpredictable (i.e., lacks reproducibility), and it depends on the proficiency of researchers or human operators (is labor-intensive and time consuming) as well as inherent stochasticity of the process. A desired goal of exfoliation methods is to mass-produce high-quality thin flakes. Therefore, one of the challenges in 2D material research and manufacturing is the facile fabrication of high quality raw 2D material flakes (such as graphene monolayers generated from graphite crystals).

To overcome manufacturing challenges, chemical vapor deposition (CVD) has been applied for direct growth of monolayers over large area [A. Reina et al., *Nano Lett.,* 2009]. CVD may have higher yield but, CVD grown flakes or material show lower qualities with more defects than obtained for mechanically exfoliated flakes. Therefore, the majority of reported work uses human operators to manually adhere and peel tapes from crystals [K. S. Novoselov et al., *Science,* 2004 (citation: 59673)]. Some have tried to induce micromechanical cleavage with the application of mechanical forces generated by various methods. For instance, a lathe-like method uses an ultra-sharp single crystal diamond wedge. The wedge is slid over the tip of a bulk crystal [B. Jayasena and S. Subbiah, *Nanoscale Res. Lett.,* 2011 (citation: 215)]. Such lathe-like method can be scaled-up for widespread industrial manufacturing, but the resultant exfoliated flakes are too thick (about tens of nanometers) and thus may be unsuitable for applications that require atomically-thin flakes. Another method uses a three-roll mill machine using adhesive [J. Chen et al., *J. Mater. Chem.,* 2012 (citation: 131)]. Adhesive and graphite flakes are fed into a three-roll mill machine; graphite flakes are mechanically processed by moving through three moving rolls and continuously exfoliated. However, the exfoliated flakes produced by this three-roll mill machine method are contaminated by adhesive residue. With other methods using sonication, ball-milling and fluid dynamics, the exfoliated flakes have defects which lowers the quality. Therefore, the resultant materials are difficult to clean and may not be suitable for applications that require a more stringent material quality, such as quantum electronic devices.

An attempt to mimic manual mechanical exfoliation has been reported [K. DiCamillo et al., IEEE Trans Nanotechnol. 2019 (citation: 4)] using a rheometer with top and base plates parallel in the vertical direction. The plates were wrapped with wafer dicing tape. The top plate moved up and down like a stamp and rotated in one exfoliation cycle. A step-and-repeat exfoliation process could be achieved with programmed contact force and liftoff speed. The rheometer was used to exfoliate small $MoS_2$ and $MoTe_2$ bulk flakes by running 60 exfoliation cycles to obtain flakes. After exfoliation cycles, thermal release tape was used as an intermediate step to transfer flakes on $SiO_2$ substrates. The substrate with thermal release tape was heated up at 180° C. for 2 min to make the thermal release tape less sticky and complete the transfer process. With this rheometer-based exfoliator, the effect of the number of cycles, contact force, and adhesive tapes on the number of few layer flakes was studied. In addition to these approaches inducing micromechanical cleavage. other attempts have tried to improve mechanical exfoliation applying forces generated by for example, sonication, ball milling, or fluid dynamics [M. Yi and Z. Shen, J. Mater. Chem. A, 2015 (review paper)]. However, these attempts yield low-quality materials with more defects and contaminations than seen in manual human-driven methods.

The rheometer-based exfoliator (semi-automated method) can be considered as an attempt to automate the tape exfoliation process. The rheometer-based exfoliation is conducted in an ambient lab environment, without liquids or chemicals involved in the process except the adhesive tape. Wafer dicing tape does not leave significant residue. The reported rheometer-based exfoliator method is a semiautomated exfoliator with limited controls: contact force and lifting speed, the number of cycles, and choice of adhesive. Sample loading and transfer onto a target substrate is however performed manually. The automated aspects include the contact and peel-off motions and rotation. With this method the stamping motion repeats through multiple cycles by using the rotation of the top plate with the affixed parent crystal, so that the next exfoliation cycle uses a fresh area. The method may increase the reproducibility of obtaining high quality thin flakes by controlling contact force and lifting speed. However, the semiautomated exfoliator method with limited controls is not sufficient to reproduce manual exfoliation.

An old version prototype exfoliator is part of a first generation of a larger automated machine called the QPress, or Quantum Material Press. This old version exfoliator used a stamp made of a polymer (PDMS) instead of a tape to perform basic robotic motions such as pushing and pulling.

The basic factors important to mechanical exfoliation were tested and determined with the old version exfoliator. Pressure-sensitive adhesives have been studied. The adhesive tapes stick to surfaces via applied pressure. From the study there are factors that can be controlled, such as pressure, temperature, and dwell time (how long the tape is adhered on a surface). The QPress exfoliator is upgraded with functions to quantitatively control lamination (rolling) and delamination (peeling-off) conditions; temperature and pressure with various adhesives. With this setup, basic tests for different parameters and specifications for automation can be assessed since the previous attempts to mimic the human operator do not offer a level of control over a wide set of exfoliation parameters.

New heterostructure materials can be formed by layering ultrathin two-dimensional (2D) flakes (e.g. generated using exfoliation) in an appropriate sequence and with angular control of the atomic lattice orientation between layers. Achieving this precise heterostructure assembly is a complicated synthesis task, since delicate 2D materials (ultrathin or even atomically thin) are layered (or "stacked") on top of one another sequentially. The goal of the transfer and stacking process is to synthesize multi-layered heterostructure as designed with clean interfaces and no damage.

Manual and motorized transfer systems have been developed with control over stamp motions [Q. Zhao et al., J. Phys.: Mater. 3 (2020) 016001]. There are also commercial manual and motorized transfer systems available on the market [www.hqgraphene.com]. They employ motorized sample (e.g., x, y, and rotation) and stamp stages (e.g., x, y, and z, sometimes one more tilt axis for alignment) and use a camera or a microscope with long working distance lenses.

With manual transfer systems, the results are highly dependent on the skills of the human operator. With motion-stage systems, what is controlled for improved transfer is the speed of z-stages (up and down), of either a stamp or a sample, when they land and pick up a flake. It works for simple stacks with a few layers. However, as the number of layers increases, it becomes harder to achieve defect-free structures. Precise assembly desirably has consistent reproducible motion. More advanced assembly motions desirably have more sophisticated motions of the stamp. Also, with the limited operation system there is a slight unknown curvature of a stamp to induce smooth lamination. With this unknown curvature, it is difficult to realize well-controlled behaviors of the stamp.

Therefore, precise controls of stamp motion are desired. The present method includes precisely controlling the stamp and substrate relative position/motion to achieve a level of control in order to obtain transfer/stacking of flakes without introducing deleterious defects.

SUMMARY

The present disclosure provides a system and method for exfoliating a layer of material from a source material and for stacking the exfoliated layers. The system includes a first rotary device and a second rotary device. The first and second rotary devices are each selectively rotatable in clockwise and counter clockwise directions. A flexible tape has an adhesive surface, and the tape extends between the first and second rotary devices. A press roller is operably connected to a frame and adapted to provide a biasing force in a first direction. A stage has a chuck for securing a source substrate containing source material, and the stage is operably connected to a stage actuator for moving the stage between an initial position and a process position. The tape is disposed between the press roller and the source substrate when stage is in the process position, wherein the press roller applies pressure to the tape and the source material disposed on the source substrate to adhere the tape to the source material, and wherein movement of the stage from the process position to the initial position causes the tape to exfoliate a layer of the source material.

The present disclosure further provides a method of exfoliating 2-D material comprising:

supporting a flexible tape having an adhesive surface between a first and a second rotary device, the first and second rotary devices each being selectively rotatable in a clockwise and counter clockwise directions;

guiding the tape below a press roller operably connected to a frame and adapted to provide a biasing force in a first direction;

moving a stage carrying a source substrate containing source material from an initial position to a process position wherein the tape is disposed between the press roller and the source substrate, the press roller applying pressure to the tape and the source material disposed on the source substrate wherein the tape adheres to the source material; and moving the stage in a process direction from the process position to the initial position and advancing the tape in the process direction the causing the tape to exfoliate a layer of the source material.

The present disclosure still further provides a stacker for forming layered heterostructure materials, the stacker including a sample stage having a support surface for supporting a substrate having exfoliated flakes deposited thereon. The sample stage is configured for at least three degrees of motion. A stamp stage is disposed adjacent the sample stage, the stamp stage having a stamp holder and being configured for six degrees of motion. A polymeric stamp is held by the stamp holder. A microscope is directed at the substrate supported on the sample stage.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

The present system for exfoliating 2-D materials including an exfoliator and stacker. The exfoliator includes a combination of: (1) use of a laminator-like assembly of rollers to apply forces to the contact area between an adhesive tape and the material or substrate, (2) configuring the tape in a roll-to-roll system to allow continuous operation and control of tape tension, (3) precision-engineering and online monitoring to provide control and reproducibility, (4) control of processing parameters (including pressure, rolling speed, substrate temperature, tape tension, and tape pull-off angle/speed) allowing access to a broad range of exfoliation conditions not previously capable with manual exfoliation, and (5) modular design using commercial wafers (or wafer-like carriers) that can be installed in commercial automatic wafer transfer systems widely used in the semiconductor industry.

The 2D material obtained by the exfoliation is preferably graphene obtained from a bulk source material of graphite. More preferably, the 2D material may be in the form of flakes and the flakes may be high-quality flakes. However, it is contemplated that the present exfoliator 10 may be useful to exfoliate any materials of interest. For example, other high-quality flakes can be produced from materials for which it is hard to obtain such high quality, for example, molybdenum disulfide and tungsten disulfide, which are more brittle than graphene. It is also possible to make a library-type database of different flakes obtained from a variety of materials.

Figure 1:
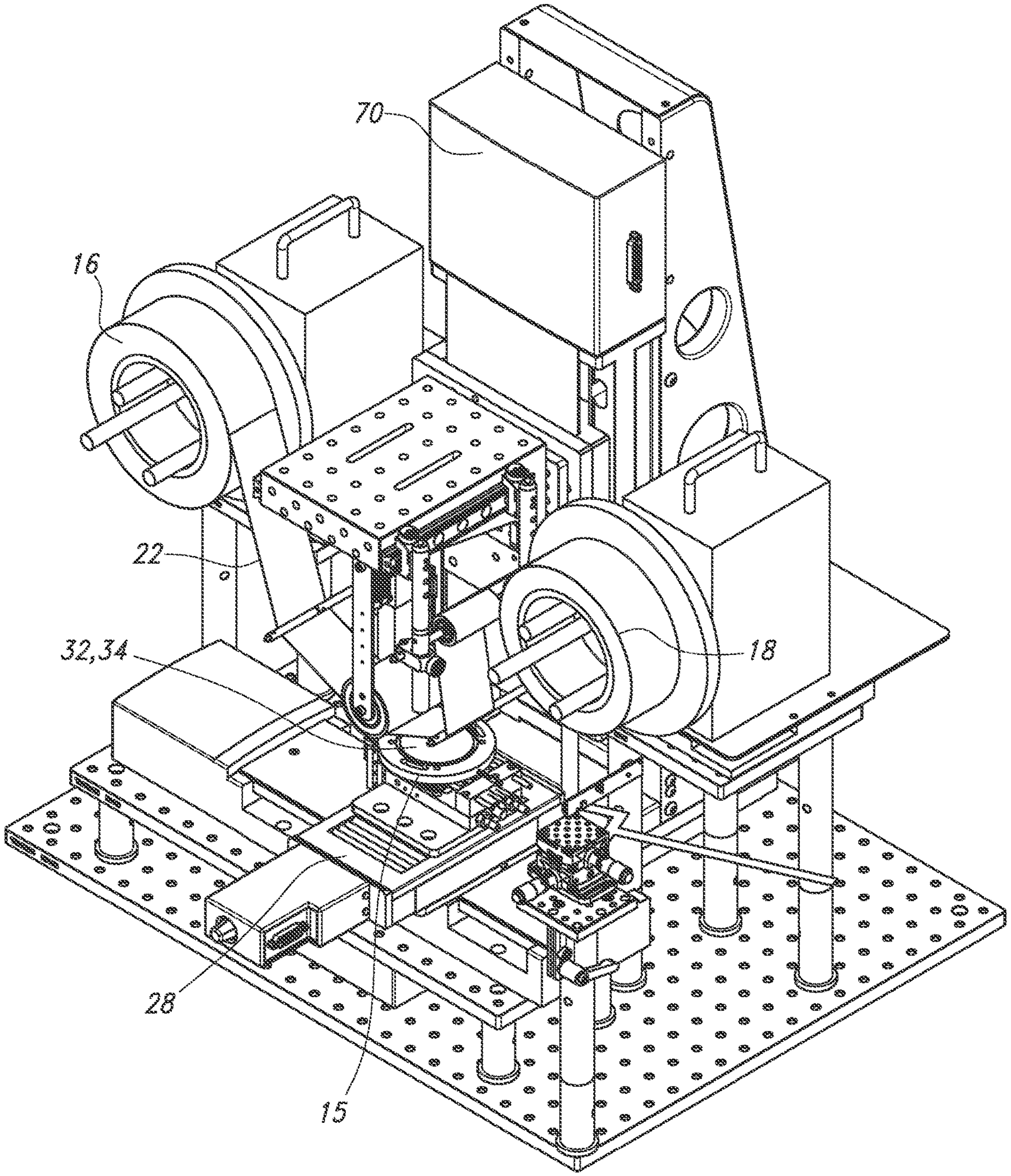
FIG. 1. is a perspective view of the exfoliator of the present disclosure.
Figure 2A:
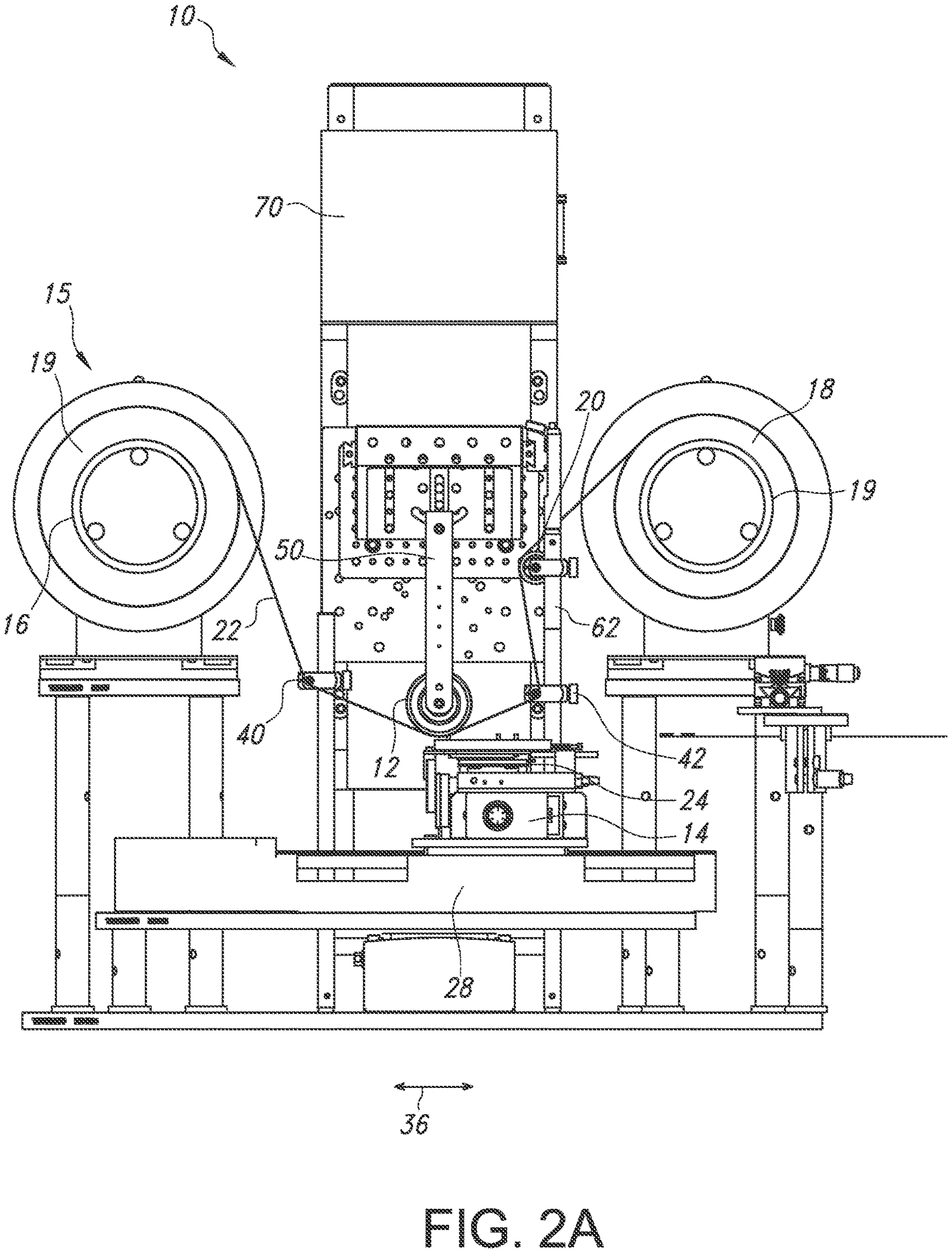
FIG. 2A is a front elevational view of the exfoliator of FIG. 1.
Figure 2B:
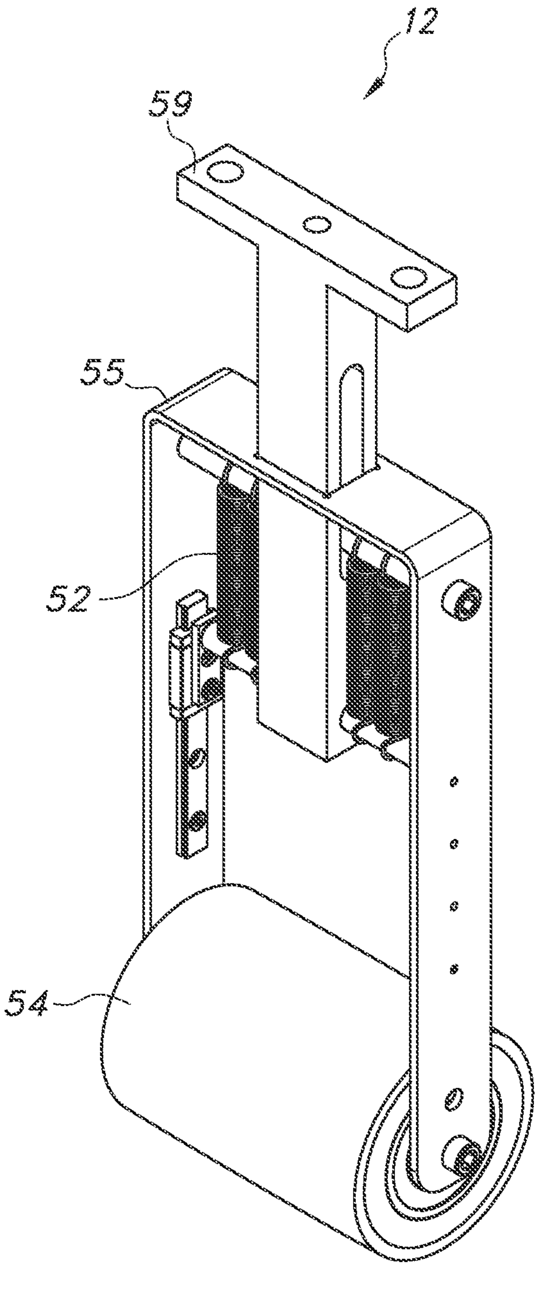
FIG. 2B is a perspective view of a pressure roller in an uncompressed state.
Figure 2C:
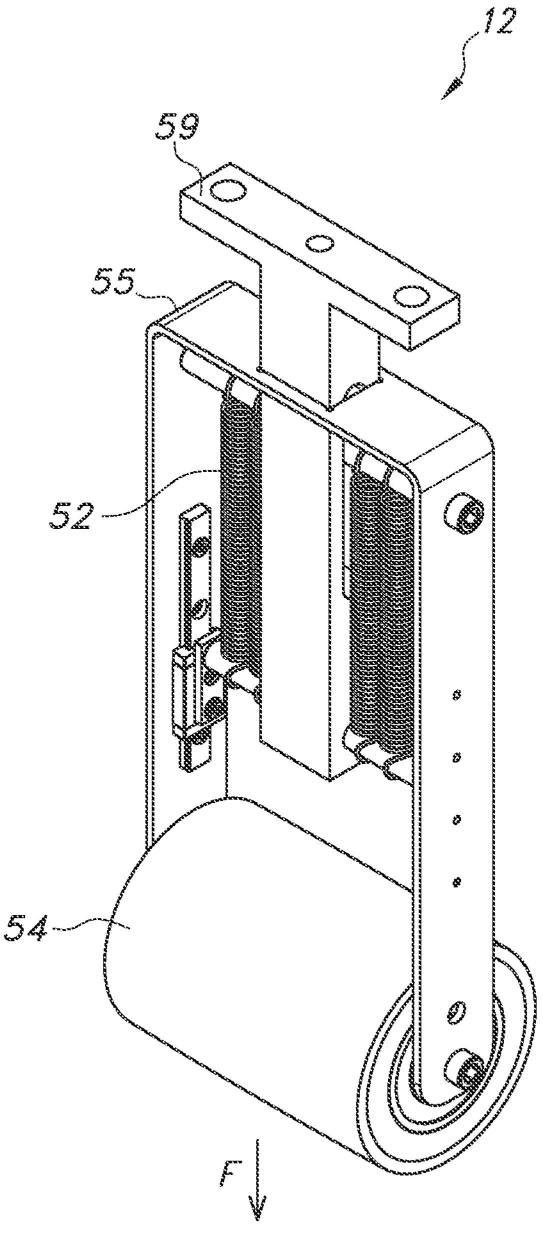
FIG. 2C is a perspective view of a pressure roller in a compressed state shown exerting a pressing force F.
Figure 3:
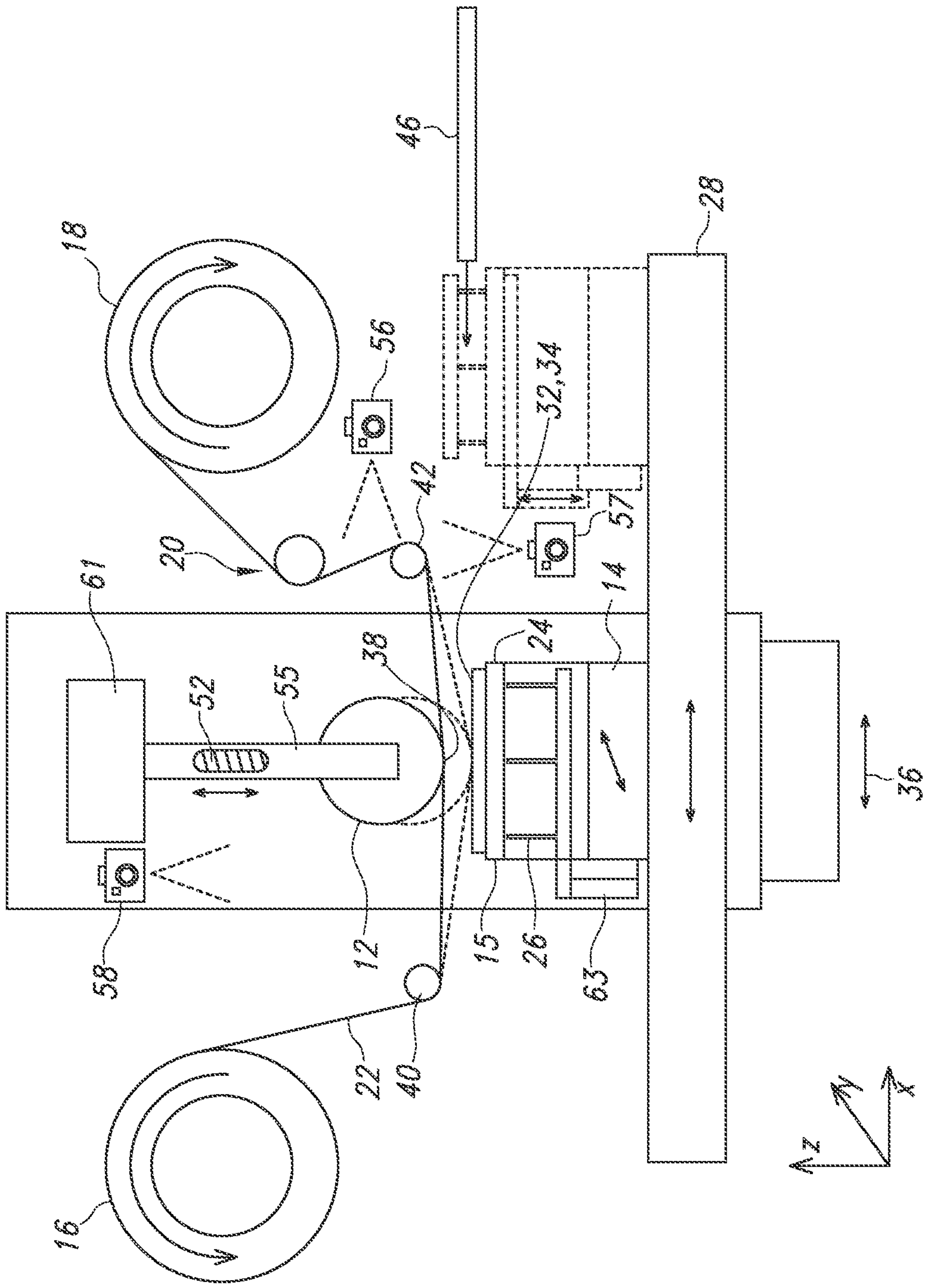
FIG. 3 is a schematic view of the exfoliator of FIG. 1.

With reference to FIGS. 1-3, the exfoliator 10 includes a spring biased press roller 12 attached to a frame 13. A tape control system 15 includes a first and second tape rewinder 16 and 18 on each side of the press roller 12 for moving and controlling a tape 22 extending between the first and second rewinders 16 and 18. The exfoliator 10 further includes a peeling angle control roller 20 disposed between the press roller 12 and the second rewinder 18. As shown in FIG. 3, a sample stage 14 with a thermal vacuum chuck 24 with lifting pins 26 on stage 14 which is operable connected to a motorized linear actuator 28 capable of moving the stage in the X and Y axis. The linear actuator may be operably connected to a programmable controller 70. The controller 70 may of a type knew in the art of industrial controls and includes a processor for controlling the linear actuator according to a predetermined set of instructions.

Figure 5:
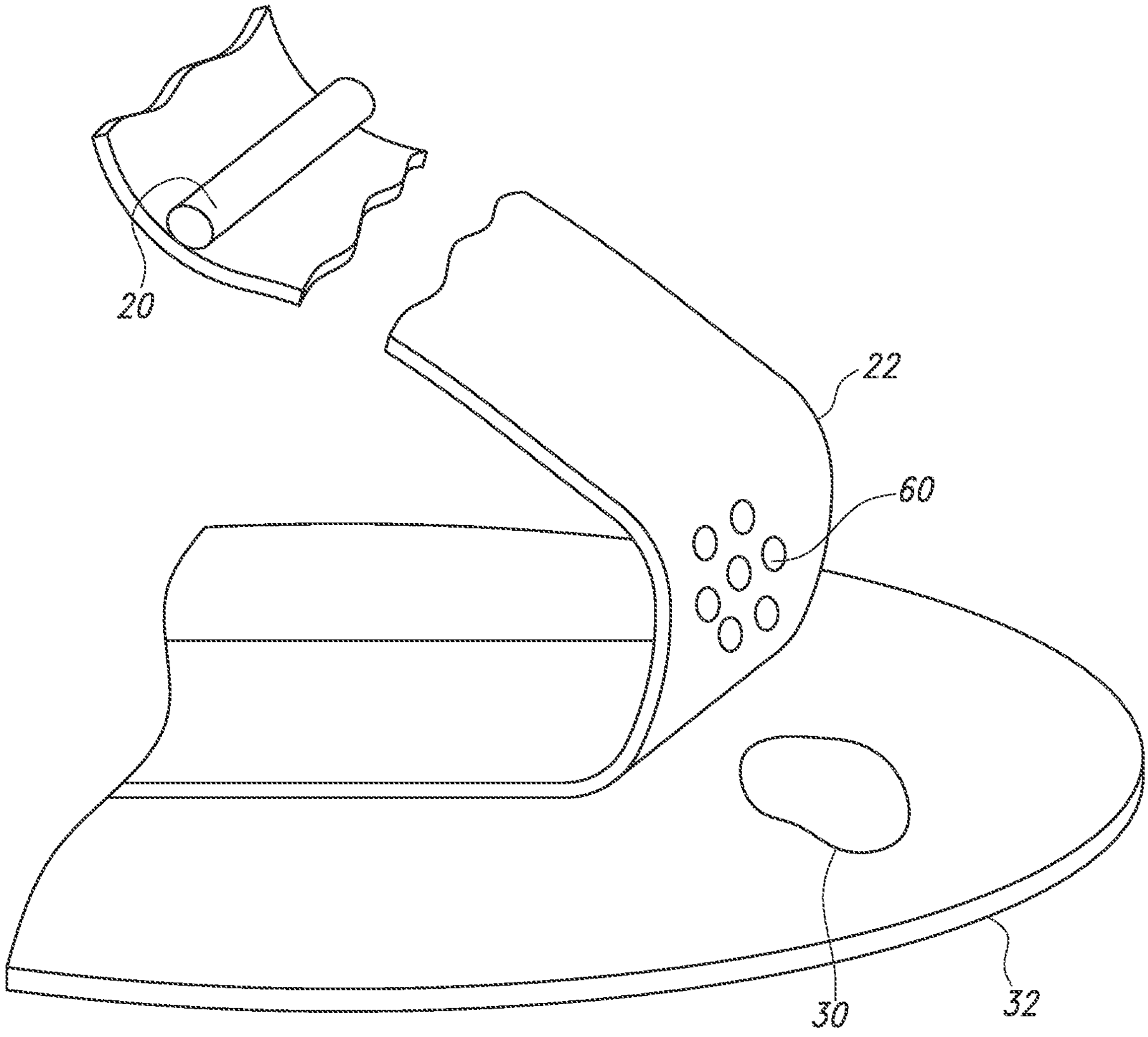
FIG. 5 is a detail view of a tape exfoliating material from a bulk sample onto an adhesive tape.
Figure 6:
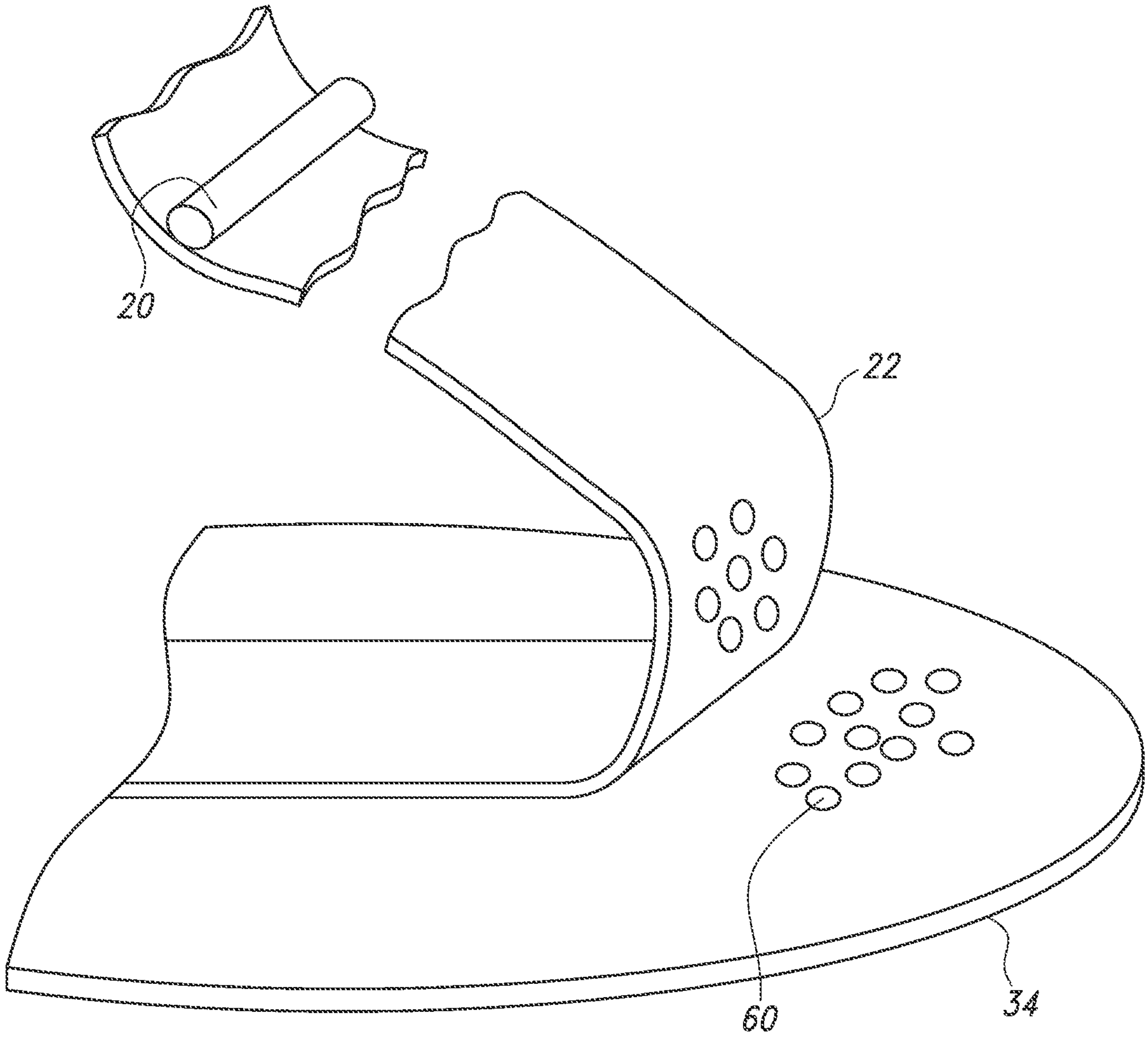
FIG. 6 is a detail view of a tape exfoliating material from the tape onto a target substrate.
Figure 7:
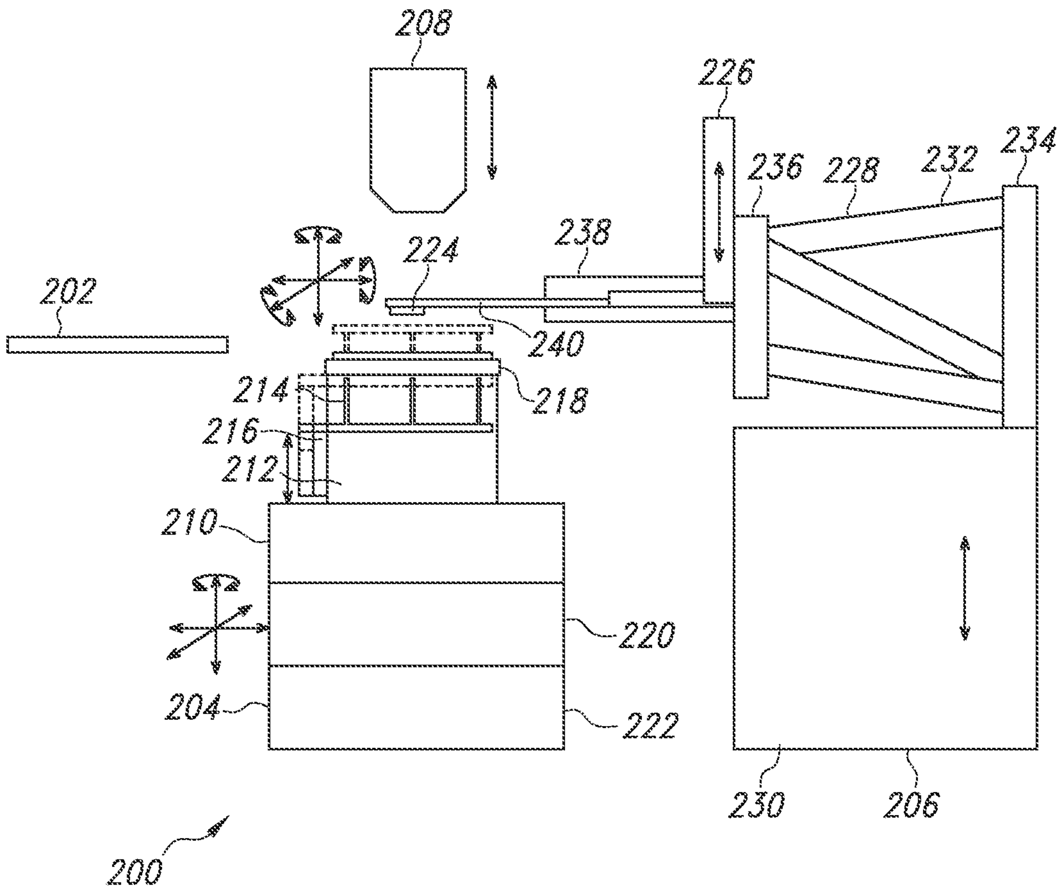
FIG. 7 is a schematic view of a stacker of the present disclosure.
Figure 8:
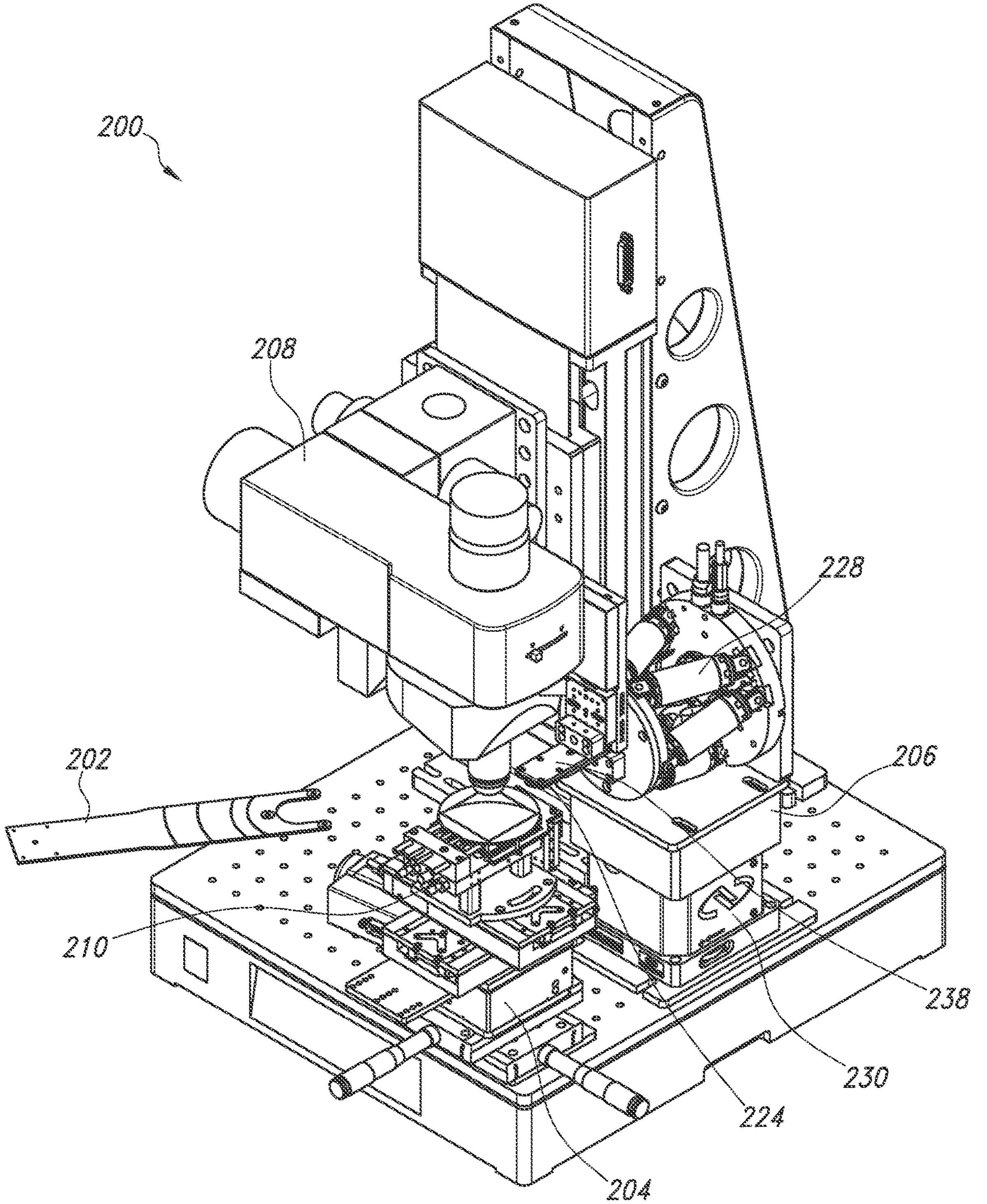
FIG. 8 is a perspective view of the stacker.
Figure 9:
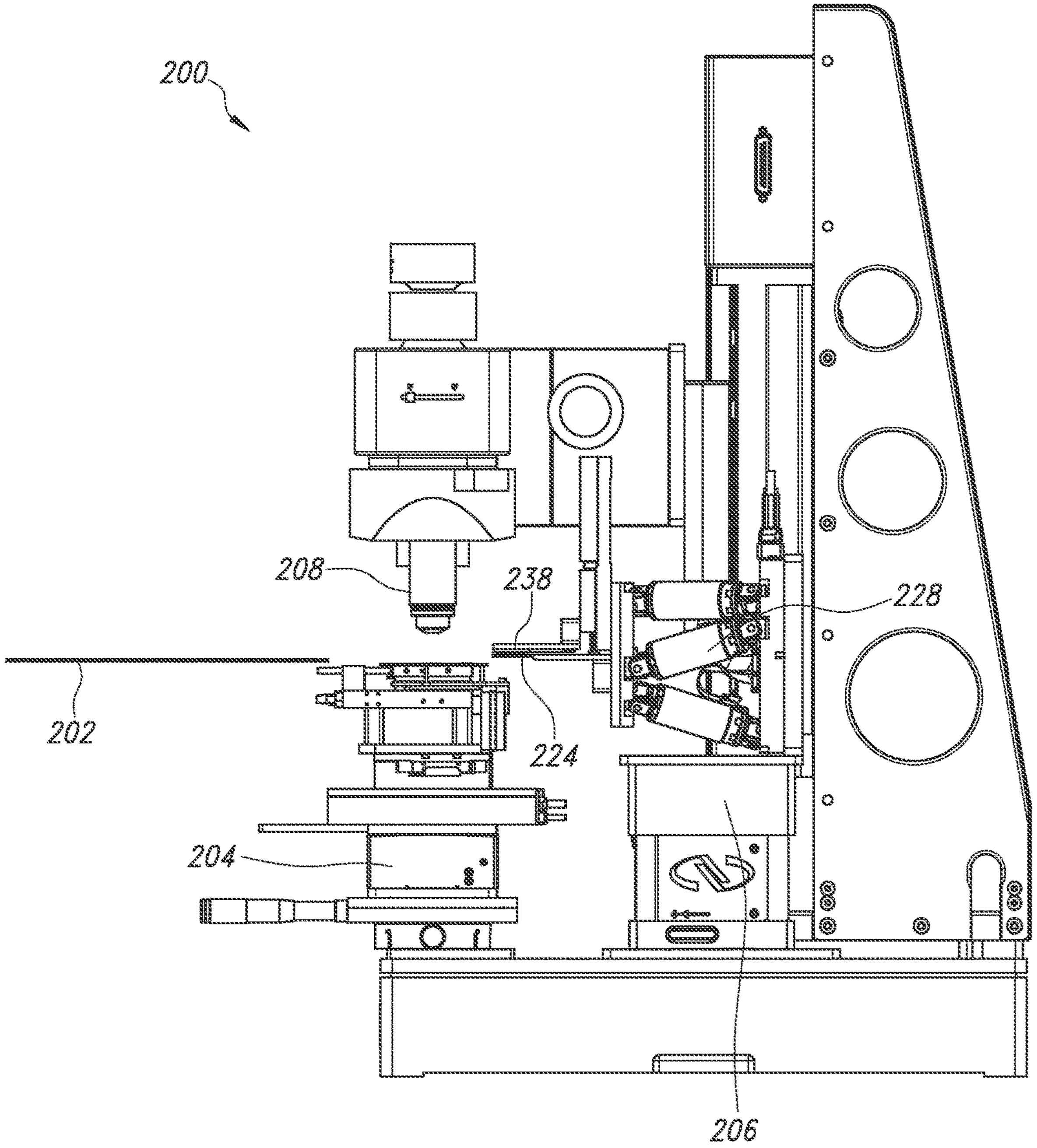
FIG. 9 is a side elevational view of the stacker.

With additional reference to FIGS. 5 and 6, the exfoliator 10 exfoliates a thin layer of material from a source material 30, such as bulk crystal, onto a thin, flexible, adhesive tape 22. The source material 30 is disposed on a source substrate 32 such as a silicon wafer. The exfoliated layer(s) of material 60 adhered to the tape is then subsequently exfoliated/separated from the tape 22 onto a target substrate 34, such as an oxide-coated silicon wafer.

The tape control system 15 includes the first and second automatic tape rewinders 16 and 18. The rewinders are rotary devices each capable of being independently controlled to rotate in the clockwise and counterclockwise direction. The rotary devices include reels 19 to which the tape is attached for spooling and unspooling the tape 22. In one embodiment, the rewinders include brushed DC motors, operably connected to the controller 70, which are moved in a coordinated manner to tension and move tape 22. The first and second rewinders 16 and 18 are set to rotate in the opposite directions from each other in a default condition to impart tension on the tape 22. For example the first rewinder 16 rotates counterclockwise and second rewinder 18 rotates clockwise. By changing the applied voltage of each of the first and second rewinders, the tape tension can be changed. The first and second rewinders not only tension the tape 22, but they can also move the tape 22 back and forth a processing direction as shown by arrow 36 in FIG. 2A such that the relative position of tape and exfoliated layer of material 60 adhered to the tape can be controlled. For example, if the second rewinder 18 is energized to rotate in the counterclockwise direction and the first rewinder 16 is not driven, i.e., allowed to freely rotate (or, alternatively, is also rotated in a counterclockwise direction), the tape 22 will be moved along the process direction 36.

The tape 22 may include commercially available wafer dicing tape which is a backing tape used during wafer dicing or some other microelectronic substrate separation. Wafer dicing tapes are used in the semiconductor industry because they leave less residue on the wafer surface after exfoliation. Alternatively, the tape 22 can be for example a simple commercial pressure-sensitive tape having an adhesive layer, the same that is used in an office setting. Using commercial tapes allows for the testing of different kinds of adhesives. The adhesives used in mechanical exfoliation are polymers.

Figure 4:
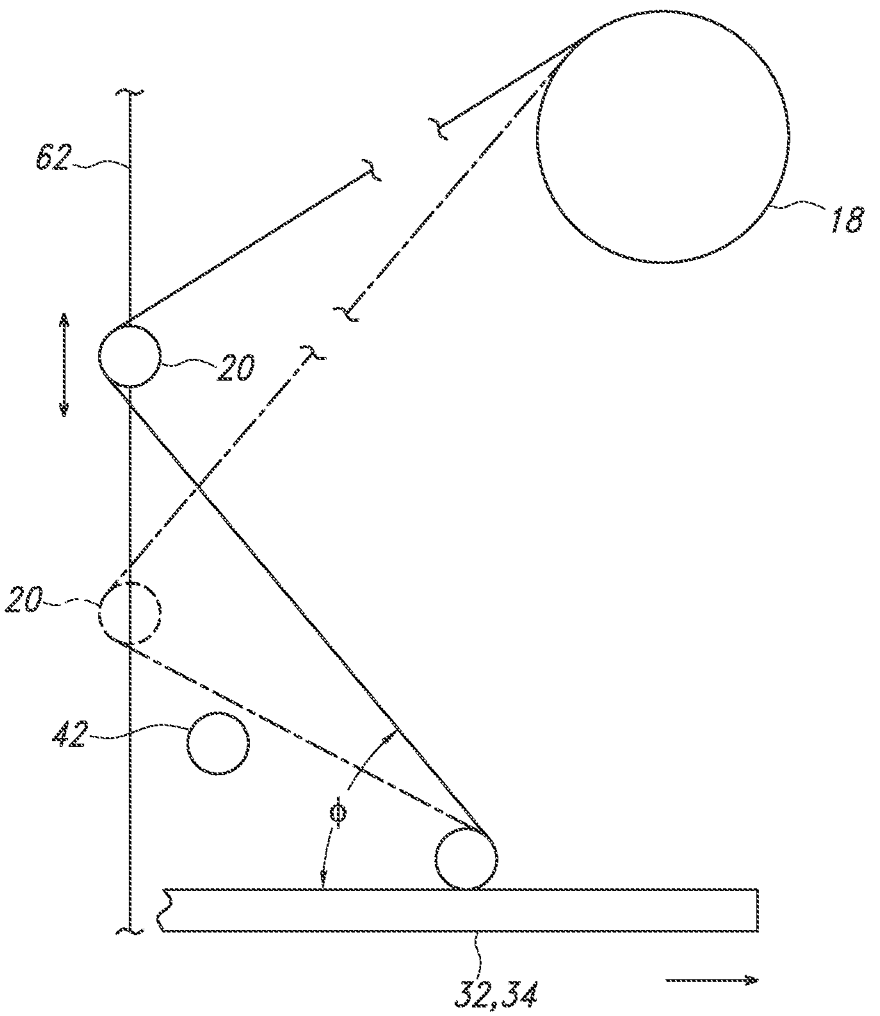
FIG. 4 is schematic view of a peeling adjustment roller of the exfoliator of FIG. 1.

With reference to FIG. 4, the tape 22 extends in a continuous uninterrupted manner from the first rewinder 16 over a first guide roller 40 and below and across a face 38 of the press roller. The tape 22 then further extends over a second guide roller 42, around the peeling angle adjustment roller 20 and then onto the reel of the second rewinder 18. The peeling roller 20 may be slidably secured to a post 62 that extends perpendicular to the stage surface 15. The angle is monitored by camera 3 in FIG. 3. The position of the peeling adjustment roller 20 may be adjusted up and down the post to change the peeling angle and resulting peeling force as desired. For example, if the tape 22 is peeled at 45 degrees instead of 90 degrees, the peeling force changes. The relationship between the peeling angle and the peeling force can be shown by the following equation:

$$\text{Peeling force } \frac{F}{b} = \frac{R(c)}{1-\cos\theta} + E(R(c))$$

-continued

θ: Peeling angle $R(c)$: adhesion energy c: Peeling speed $E(R(c))$: elastic energy for tape extension With the tape 22 in place as shown in FIG. 1, the source material 30, such as graphene bulk crystal. is loaded onto source substrate 32 which is then loaded onto a thermal vacuum chuck 24 that is selectively in communication with a vacuum source for holding and releasing the source material. The vacuum chuck 24 is disposed on the linear sample stage 14, which is capable of translating along a first linear path Y-Y. The stage 14 is on top of another linear stage 28, which moves along a second linear path X-X having an axis perpendicular to that of the first linear path. The source material 30 is secured to the source substrate 32, and the substrate 32 is held by vacuum to the chuck 24. The source material 30 is secured by vacuum to the chuck 24. The sample stage 14 holding the bulk crystal aligns the bulk crystal 30 with the tape 22, and is then translated by a linear actuator (or motorized stage) 28 from an initial position show in FIG. 2 to a process position shown in FIG. 3 in which the source material is moved under the press roller 12. The press roller 12 presses the tape 22 onto the source material 30 as the press roller 12 rolls over the tape 22 and the source substrate 32. This process can be repeated with moving X and Y stages like mosaic pattern if users use small bulk crystal (for example, powder type) so that the users want to spread the crystal over the tape 22. Heat may also be applied by the thermal vacuum chuck 24 to assist in exfoliation from the source material 30.

With further reference to FIGS. 2B and 2C, the press roller 12 may be part of a pressure control system 50 that controls the amount of pressure applied by the roller onto the tape 22 and the source material 32. Pressure is applied using the spring-based press roller 12 backed by the vacuum chuck 24, sample X stage 28 and Y stage 14. The press roller 12 includes a spring 52 and a roller 54 secured to a frame 55. A T-shaped support 59 extends through the frame 55 and secures the press roller 12 to the exfoliator. The frame 55 with roller 54 move relative to the support 59. It is also contemplated that other means of applying a pressing force F in a controlled manner, such as pneumatic actuators or electromechanical actuators, engagement loaded, and gravity loaded type rollers may be employed. The spring 52 can be compressed, for example, by ~30 mm. Selection of the spring 52 enables application of pressure across a far wider range than a human operator would be able to apply by hand. In one embodiment, the roller 54 may, for example, be formed of Shore 70A silicone, and be 50 mm in diameter, 70 mm long, and have a crowned profile. It is contemplated that rollers formed of other material and having other dimension could be used. Depending on the stiffness of the rubber, the footprint of the roller varies, allowing it to be optimized for different target materials (source material or source substrate). In addition, uniform pressure distribution contributes to desired exfoliation.

The support 59 is connected to the vertical stage (roller Z) 61, so that it can move up and down to retract and extend the springs 52 by the motorized vertical stage. Until the roller 54 makes a contact with the substrate, the entire roller assembly moves together. Once the roller 54 touches a substrate, the roller remains on the substrate. The vertical stage continues to move down and then only support 59 moves down following the vertical stage. Then, the spring extends and generates force F which is transferred to the roller 54 and onto the tape.

With the exfoliator 10, the pressure and the distribution can be calibrated using pressure sensitive films such as Pre-scale® films marketed commercially by FUJIFILM Corporation. Such films can measure pressure and pressure distribution by exhibiting a visual indication. A slightly crowned roller 54 can also be used, allowing yields with more uniform pressure distribution at the center (target) area than a straight roller. The exfoliator 10 can be further refined by adding a pressure sensor (not shown) for more precise and real-time control.

After the tape 22 and source material 30 are acted upon by the press roller 12, the linear stage 28 moves from the processes position back to the initial position shown in FIG. 2. This motion combined with the tape 22 being supported by the peeling angle adjustment roller 20, causes the tape 22 attached to the substrate to be peeled off the source material when it passes under the peeling-angle roller 20, thereby exfoliating a layer of source material such as a thin layer of material, e.g., 2D layer, that is exfoliated material 60 from the source material. After exfoliation, thin 2-D layer(s), also referred to as flakes, or high quality flakes, of exfoliated material 60 are deposited on the tape 22 as shown in FIG. 5.

The source substrate 32 is then removed from the vacuum chuck 24 and a target substrate 34 is set on the stage. This target substrate 34 may be a silicon wafer. The transfer of the source substrate from the stage and its replacement by the target substrate may be accomplished by a robotic wafer transfer mechanism 46 using a robotic arm of a type know in the art.

Upon coordinated rotation of the first and second rewinders 16 and 18 as well as translation of the sample stage 28 toward the process position, the tape 22 is moved such that the exfoliated material 60 is relocated under the press roller 12. This results in the exfoliated material 60 being exfoliated from the tape 22 and deposited onto the target substrate 34. For this exfoliation, the sample stage temperature is controlled, and contact pressure is controlled by changing compression depth. The stage is moved back to the initial position and the tape 22 is peeled off the target substrate leaving the exfoliated material 60 on the surface of the target substrate as shown in FIG. 6. When the tape is peeled off, peeling force, angles, and speed are controlled.

The exfoliator 10 is fully automated including sample (or bulk crystal) carrier loading and unloading process. This provides compatibility with commercial automatic wafer transfer systems 46 using robot arms widely used in semiconductor manufacturing industries. With reference to FIG. 3, this system is achieved by applying three lifting-pins 26 120° apart around the square thermal vacuum chuck stage 14, operated by a linear actuator 63. To load a sample (or a bulk crystal) carrier, the pins are moved up slightly over the thermal chuck stage to make a gap (>2 mm) for a robot arm to slide in with the carrier, and the robot arm places the carrier on the lifting pins. Then, the pins are moved down below the chuck stage, and the carrier is placed on the stage surface. The vacuum chuck is turned on to hold the carrier and complete the carrier loading process. To unload the carrier, the vacuum is turned off and the lifting pins are moved up. When the pins are up over the chuck stage, the lifting pins push the carrier up and again make a small gap. The robot arm goes into the gap and takes over the carrier from the pins.

Sample (or bulk crystal) carrier: commercial 3" wafers (e.g. silicon) can be used directly as a source substrate 32, with exfoliation occurring in the central 2"×2" area of the wafer. A larger exfoliation area can be obtained through a straightforward increase of device dimensions, which enables bulk production of high-quality thin flakes to be achieved. For cases where smaller areas or custom-shaped wafers are targeted, a sample and bulk crystal carrier compatible with commercial wafer storage racks and wafer aligners can be used; in this way, any substrate (material. size, shape) can be used in the present device. A universal sample holder is a circular (wafer-shaped) aluminum plate with 3" diameter and a 0.875" long flat, with 2"×2" recessed area at the center to mark for accurate loading target substrates.

The thermal vacuum chuck 24 is used to control temperature in the range of room temperature up to 200° C. during the exfoliation process. In the present system, the substrate or the surface of the substrate may be heated before, during, or after the application step. A heated surface produces a stronger and more uniform contact of source material flakes on the surface and increases the yield. Air can be used for cooling the stage before peeling-off. Alternatively, water or other liquids can be used for more rapid cooling or cooling below room temperature as desired.

Three monitoring cameras 56, 57 and 58 can be used for more precise control and for collecting data before and after exfoliation. They can also be used for further automation using machine vision. After the lamination of the tape over target substrate (or bulk crystal), the sample stage is slowly brought back to the origin. Since the tape is attached to the substrate, it moves with the sample stage. The tape 22 is peeled off by the right rewinder. Peeling angle and speed can be controlled by changing rewinder power (peeling force), sample stage speed, and an angle-adjustment roller. Camera 56 is installed over the sample stage to show the tape 22 after exfoliation. With this camera, the flakes of exfoliated material after the exfoliation from bulk crystal to tape and the exfoliation from the tape to a target substrate for accurate analysis can be monitored. Camera 58 is installed on top of the press roller stage and shows the area where the pressure will be applied. With this camera, the area with the source flakes can be located. Camera 57 is installed in front of the exfoliator system 10 to show the peeling angle in a side view. With this camera, we can monitor the angle and adjust the rewinder power accordingly.

In one embodiment of the present exfoliator, for full automation including bulk parent crystal deposition and tape exfoliation on a substrate, pressure may be controlled, so it may be low enough not to break the crystal but high enough to press the tape firmly onto the substrate.

In other embodiments, additional cameras for diagnostics and process control may be used. Images of bulk crystal, tape, and target substrate may be captured, before and after exfoliation and used for more precise analysis. One skilled in the art can optimize the conditions of the present exfoliator. For example, the present exfoliator may include more refined control of peeling-off conditions such as more refined peeling angle, force, and speed. In that case, more angle-control rollers or powerful tape rewinders can be added. PID control can also be applied to automate the angle control with the camera and power supply For more precise pressure control, a press sensor on the sample stage could be added.

The present exfoliator may be integrated into a multicomponent system. For example the present exfoliator may be combined with a stacker 200, as shown in FIGS. X and Y, wherein robot arms 202 can be used to transfer samples from the exfoliator station to the stacker. This workflow may be automated. The exfoliator, and the stacker may be combined together or with other different modules.

The stacker 200 shown in FIGS. X and Y can be used to form heterostructure materials by layering ultrathin two-dimensional (2D) flakes (e.g. generated using exfoliation) in an appropriate sequence and with angular control of the atomic lattice orientation between layers.

One of the most versatile methods for transfer of various 2D materials is dry (or hot) transfer methods. Thermoplastic or viscoelastic polymers are used as a “stamp” to pick up a flake from a substrate at high temperature near the stamp material’s glass transition temperature. resulting in stronger adhesion to the flake than that between the flake and the substrate. To release the flake, the temperature can be increased past the melting temperature of the polymer and let the stamp release adhered material onto the substrate. Thus, thermal control can be used to modulate relative interfacial adhesion energies and stamp rigidity, allowing a selection between stamp pickup (transfer from substrate to stamp) or release (transfer from stamp to substrate). This process can be used to select and pick up a target flake from a substrate, deposit a stamp-supported flake to a desired location on a new substrate, or to transfer a stamp-supported flake on top of an existing flake on a substrate. The stamp residues are rinsed by solvents after the drop-off.

The present stacker 200 is a fully motorized and robotic transfer system for stacking exfoliated flakes and generally includes a sample stage 204. a motorized stamp stage 206 and a microscope 208 forming a modular design. The modular design of the stacker 200 allows for easy implementation with the exfoliator described above. For example, the stacker 200 can be implemented in a system together with the exfoliator described above. In such an embodiment, the sample stage 204 can be shared between the exfoliator and the stacker, wherein the sample stage travels between the exfoliator station and the stacker 200. If, on the other hand, separate respective sample stages are to be used for the exfoliator and the stacker 200, a robot arm 200 can transfer samples between the exfoliator sample stage and the stacker sample stage 204.

In either case. the sample stage 204 is provided with at least three (3) degrees of motion. As described above with respect to the exfoliator sample stage, suitable actuators can be implemented to move a platform 210 in a horizontal X and Y direction, while a linear actuator 212 can be implemented to lift a lifting pin arrangement 214 in a vertical direction with respect to the platform. Also similar to the sample stage described above, the sample stage 204 of the stacker 200 also includes a thermal vacuum chuck 216 having a support surface 218 for supporting the sample. As described above, the sample can be held to the support surface 218 by a vacuum pressure applied by the thermal vacuum chuck 216 and the temperature of the sample can be controlled by heating elements of the thermal vacuum chuck.

The sample stage 204 of the stacker 200 can also be provided with an additional rotation actuator 220 to provide rotational movement to the sample in the horizontal plane. In addition, if the sample stage is to be shared between the exfoliator and the stacker 200, the sample stage can include further manual or motorized stage positioners 222 to move the sample stage 204 between the stations. The sample stage 204 of the present stacker is compatible with the present exfoliator and commercial standardized wafer handling systems. This means the present stacker system can be installed as a part of commercial wafer transfer systems with sample loading/unloading system cooperating with conventional robot arms and wafers and with the present exfoliator system.

The motorized stamp stage 206 supports a stamp 224 on which flakes of material exfoliated with the exfoliator can be stacked. The stamp 224 is held on a motorized gripper 226, which, in turn, is supported on a hexapod assembly 228. The hexapod assembly 228 can be mounted on a movable base 230.

The hexapod assembly 228 enables the control of six (6) axes of stamp motions (including X, y, z, pitch, yaw, and roll). The hexapod assembly can take the form of a Stewart platform that has six prismatic actuators (e.g., electric linear actuators 232) attached in pairs to three positions on the platform's base plate 234, crossing over to three mounting points on a top plate 236, with all twelve connections being made via universal joints. The motorized gripper 226 attached to the top plate 236 is thus provided with six degrees of freedom in which it is possible to move three linear movements (x, y, z) and three rotations (pitch, roll, yaw). With the hexapod 228, a pivot point can be set of the three tilt axes right on a target flake, which enables rolling motions during lamination.

Thus, the present stacker 200 does not necessarily rely on intrinsic curvature of stamps, since arbitrary points along the stamp 224 can be brought into the center-of-rotation, and arbitrary rolling motions can be computed and applied. Various shapes of stamps 224 can thus be used, for example, flat, patterned or other shapes of stamps.

The motorized gripper 226 includes a stamp holder 238 that can be set up in various forms. One set up for the stamp holder 238 has simple gripping attachments holding a glass slide with a polymeric stamp 224 where the stamp has an original state. This can be improved further, for example, by providing a heating element 240 to the stamp holder 238 for heating the polymeric stamp 224. Picking up flakes near the glass transition temperature of stamping polymers may result in the stamp thermally expanding from its original state. After picking up flakes, as the stamp is moved away from the heated sample surface, the temperature of the stamp drops and the stamp shrinks back to the original state. This thermal expansion and contraction may cause strain on the flakes that are on the stamp. The strain on the flakes may can cause defects to form in or on the flakes such as wrinkles and cracks. The heated stamp holder just below the glass temperature is expected to help prevent the flakes from getting defects or damage caused by the temperature fluctuation during picking-up cycles. Furthermore, with the stamp heating holder 238, it is expected that temperature sensitive shape-memory polymers can be used as a stamp. The shape of the stamp can be engineered and arrays of micro-stamps can be made to pick up target flakes at specific locations.

The microscope 208 is preferably a high-resolution microscope with long working distance lenses (×5, ×20, and ×50) and control over focal position.

As mentioned above, the stacker 200 may be part of an automated multicomponent system in which robot arms transfer samples from the exfoliator station to the stacker. The system according to the present invention thus enables experiments with precisely controlled environments.

The system may further include a cataloger and one or more characterization stations. The cataloger allows for recording of the locations and properties of exfoliated flakes, and may include a library containing a database of 2-D flakes. The one or more characterization stations will identify the crystal structure and orientation of exfoliated flakes and layered materials. An automated workflow to move samples between these modules may also be utilized.

An exfoliator or stacker in accordance with aspects of the present disclosure can be employed in essentially any modular system. Systems incorporating such exfoliators or stackers are considered part of this invention. Given the teachings of the present disclosure provided herein, one of ordinary skill in the art will be able to contemplate other implementations and applications of embodiments of the invention.

In the dry transfer process. the interface quality between layers is determined by the precise control of the lamination since it is very easy for air, water, or any kinds of impurities to be trapped at the interface during lamination. Therefore, the precise controls of stamp motion are highly desired. This disclosure describes improvements to this challenge of precisely controlling stamp and substrate relative position/motion so as to achieve the required level of control in order to obtain transfer/stacking of flakes without introducing deleterious defects.

Also, this limited operation system requires slight curvature of a stamp to induce smooth lamination. With this unknown curvature, it is hard to expect that the researchers can realize well-controlled behaviors of the stamp.

Another key differentiator of the disclosed system is that the sample stage is designed to be compatible with commercial standardized wafer handling systems. This means the system can be installed as a part of commercial wafer transfer systems with sample loading/unloading system cooperating with conventional robot arms and wafers.

The QPress may have robot arms that transfer samples from the exfoliator station to cataloger, stacker, and characterization stations. This workflow may be automated. The exfoliator, and the stacker may be combined together or with other different modules. Achieving full automation may be a challenge because of different requirements in terms of sample environments, required motions, and physical space.

Those skilled in the art will appreciate that the exemplary structures discussed above can be assembled in various forms and may be therein formed in accordance with one or more embodiments of the present exfoliators or stackers.

An exfoliator or stacker in accordance with aspects of the present disclosure can be employed in essentially any modular system. Systems incorporating such exfoliators or stackers are considered part of this invention. Given the teachings of the present disclosure provided herein, one of ordinary skill in the art will be able to contemplate other implementations and applications of embodiments of the invention.

The illustrations of embodiments of the invention described herein are intended to provide a general understanding of the various embodiments, and they are not intended to serve as a complete description of all the elements and features of apparatus and systems that might make use of the exfoliators or stackers and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact. shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features. steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A system for exfoliating a layer of material from a source material comprising:
- a first rotary device and a second rotary device; the first and second rotary devices each being selectively rotatable in a clockwise and counter clockwise directions;
- a flexible tape having an adhesive surface, the tape extending between the first and second rotary devices;
- a press roller operably connected to a frame and adapted to provide a biasing force in a first direction;
- a stage having a chuck for securing a source substrate containing source material, the stage being operably connected to a stage actuator for moving the stage between an initial position and a process position; and
- the tape being disposed between the press roller and the source substrate when stage is in the process position, wherein the press roller applies pressure to the tape and the source material disposed on the source substrate adheres the tape to the source material, and wherein movement of the stage from the process position to the initial position causes the tape to exfoliate a layer of an exfoliated material from the source material on the source substrate.

2. The system as defined in claim 1, further comprising a substrate changer that removes the source substrate from the stage and replaces it on the stage with a target substrate.

3. The system as defined in claim 2, wherein the stage actuator moves the stage from the initial position to the process position and the first and second rotary devices rotate to cause the tape to move below the press roller wherein the exfoliated material is pressed by the roller onto the target substrate.

4. The system as defined in claim 2, wherein the stage actuator moves the stage to the initial position causing the layer of exfoliated material to be exfoliated from the tape and deposited on the target substrate.

5. The system as defined in claim 2, wherein the movement of the stage and the first and second rotary devices are coordinated by a controller.

6. The system as defined in claim 1, further including a peeling roller operably connected to the frame, the peeling roller being disposed between the press roller and the second rotary device and in contact with the tape, the peeling roller directing the tape toward the first rotary device.

7. The system as defined in claim 6, wherein the peeling roller is positionally adjustable to adjust a peeling angle from which the tape is separated from the exfoliated material.

8. The system as defined in claim 1, wherein the stage actuator moves the stage along a first linear axis.

9. The system as defined in claim 8, wherein the stage actuator moves the stage along a second linear axis, the second linear axis being perpendicular to the first linear axis.

10. The system as defined in claim 1, wherein the stage has a thermal vacuum chuck for applying a vacuum pressure and heat to a support surface.

11. The system as defined in claim 2, further including a camera disposed over the stage when the stage is in the initial position for viewing the target substrate.

* * * * *